(12) United States Patent  
Parham

(10) Patent No.: US 8,915,060 B2
(45) Date of Patent: Dec. 23, 2014

(54) METHOD OF VARYING A FAN DUCT THROAT AREA

(75) Inventor: Dean L. Parham, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 491 days.

(21) Appl. No.: 13/360,656

(22) Filed: Jan. 27, 2012

(65) Prior Publication Data

US 2012/0124962 A1 May 24, 2012

Related U.S. Application Data

(62) Division of application No. 12/268,902, filed on Nov. 11, 2008, now Pat. No. 8,127,531.

(51) Int. Cl.

| | |
|---|---|
| B63H 11/00 | (2006.01) |
| F02K 1/00 | (2006.01) |
| F02K 3/02 | (2006.01) |
| B63H 11/10 | (2006.01) |
| F02K 1/72 | (2006.01) |
| F02K 1/09 | (2006.01) |
| F02K 1/48 | (2006.01) |

(52) U.S. Cl.
CPC ... *F02K 1/72* (2013.01); *F02K 1/09* (2013.01); *F02K 1/48* (2013.01); *F05B 2250/61* (2013.01); *Y02T 50/671* (2013.01)
USPC .......... 60/204; 60/771; 60/226.2; 239/265.19

(58) Field of Classification Search
USPC ............... 60/226.1–226.3, 262, 230, 771; 239/265.19, 265.27, 265.31, 265.33; 244/53 R, 110 B
See application file for complete search history.

(56) References Cited

U.S. PATENT DOCUMENTS

| | | |
|---|---|---|
| 3,599,432 A | 8/1971 | Peter |
| 3,779,010 A | 12/1973 | Chamay et al. |
| 3,797,785 A * | 3/1974 | Baerresen et al. .......... 244/53 R |
| 3,829,020 A | 8/1974 | Stearns |
| 3,936,226 A | 2/1976 | Harner et al. |
| 4,279,382 A | 7/1981 | Wilson, Jr. |
| 4,865,256 A | 9/1989 | Durand et al. |
| 5,655,360 A | 8/1997 | Butler |
| 5,778,659 A | 7/1998 | Duesler et al. |
| 5,782,432 A | 7/1998 | Renshaw |
| 5,806,302 A | 9/1998 | Cariola et al. |
| 5,833,140 A | 11/1998 | Loffredo et al. |
| 7,874,142 B2 | 1/2011 | Beardsley |
| 7,950,237 B2 | 5/2011 | Grabowski et al. |

FOREIGN PATENT DOCUMENTS

| | | |
|---|---|---|
| EP | 0109219 | 5/1984 |
| WO | WO2007122368 | 11/2007 |
| WO | WO2008045056 | 4/2008 |
| WO | WO2008045072 | 4/2008 |

OTHER PUBLICATIONS

PCT International Search Report—WO dtd Feb. 26, 2010 for PCT US/2009/063863.

* cited by examiner

*Primary Examiner* — Gerald L Sung

(57) ABSTRACT

A method of varying a fan duct throat area of a gas turbine engine may include non-pivotably moving a fan nozzle outwardly relative to a longitudinal axis of the gas turbine engine during axially aft translation of the fan nozzle without activating a thrust reverser.

9 Claims, 7 Drawing Sheets

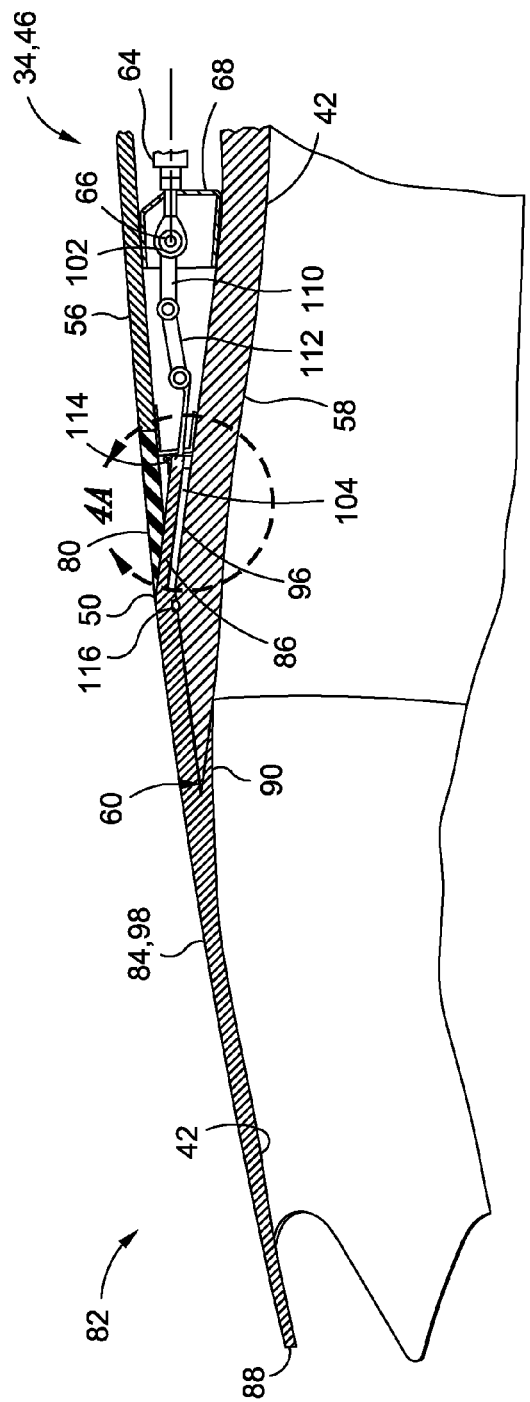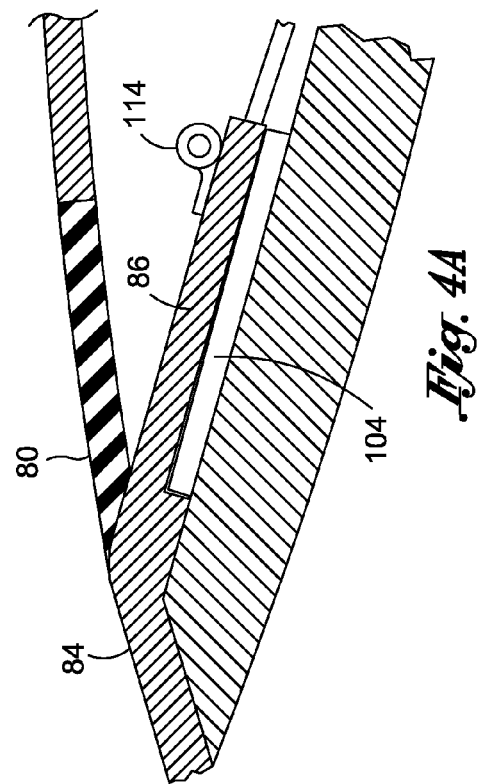

METHOD OF VARYING A FAN DUCT THROAT AREA

CROSS-REFERENCE TO RELATED APPLICATIONS

This application is a divisional application of and claims priority to pending U.S. application Ser. No. 12/268,902 filed on Nov. 26, 2008 and entitled RADIALLY TRANSLATING FAN NOZZLE NACELLE, the entire contents of which is expressly incorporated by reference herein.

FIELD

The present disclosure relates generally to gas turbine engines and, more particularly, to an engine nacelle having a variable area fan nozzle.

BACKGROUND

Aircraft noise pollution is a significant environmental problem for communities near airports. Jet engine exhaust accounts for a majority of the noise produced by engine-powered aircraft during takeoff. Because it occurs at a relatively low frequency, jet engine exhaust noise is unfortunately not effectively damped by the atmosphere alone. The prior art includes several attempts at reducing jet engine exhaust noise. Such attempts are directed at altering the flow characteristics of the engine exhaust which can be comprised of several components.

Bypass turbofan engines typically produce two exhaust stream components. A first component stream is referred to as the primary exhaust flow and is discharged from a core exhaust nozzle after passing through a core engine. A second component stream passes through an annular fan duct which surrounds the core engine. The second component stream, referred to as the fan exhaust flow, exits a fan nozzle collectively defined by an aft edge of the fan nozzle and the fan duct inner wall which surrounds the core engine. The fan exhaust stream and the primary exhaust stream collectively form the thrust that is generated by the engine.

In bypass turbofan engines, the primary exhaust flow throat area at the exhaust nozzle and the fan exhaust flow throat area at the fan nozzle are preferably optimized for specific engine operating condition. For example, during takeoff, a relatively high level of thrust is required of the engines as compared to lower levels of thrust that are required during cruise flight. Increasing the quantity or mass of airflow through the fan duct having a fixed throat area at the fan nozzle results in an increase in the velocity of the airflow. An increase in the nozzle exit velocity results in an increase in the amount of noise that is generated by the nozzle.

For example, if the fan nozzle throat area is configured for duct mass airflow at cruise conditions, then the increased mass of airflow associated with higher thrust levels will result in a higher velocity of the airflow through the fan nozzle. Nozzle exit velocities that are higher than the optimal velocity for a given nozzle exit area result in a generally higher level of exhaust noise. Noise generated by the fan nozzle exhaust may be reduced by decreasing the velocity of airflow through the fan nozzle. Increasing the fan nozzle exit or throat area results in a reduction in the velocity of the exhaust as it exits the fan duct and therefore reduces the level of noise.

Included in the prior art are several approaches to increasing the fan nozzle exit area (i.e., throat area) such as during takeoff in order to reduce exhaust noise. One approach includes linearly translating the fan nozzle in an aft direction parallel to a longitudinal axis of the engine in order to increase the fan nozzle exit area and thereby reduce the velocity of the exhaust. Although effective in reducing exhaust noise, the aft-translating approach presents several deficiencies which detract from its overall utility. For example, in some prior art engines, the aft-translating approach results in the creation of a slot or opening which allows air to exhaust through the cowl wall. Unfortunately, the opening in the cowl wall adds additional cross-sectional area rather than enlarging the exhaust nozzle throat.

Furthermore, the creation of the opening results in leakage through the engine nacelle with an associated loss of engine thrust. Additionally, the aft-translating approach requires the use of swiping seals which present a maintenance risk. An additional drawback associated with the aft-translating approach is that an overlap is created between the duct wall and the fan nozzle resulting in a reduction in the surface area of acoustic treatment in the fan duct. Such acoustic treatment may include sound-absorbing material such as honeycomb placed along the fan duct inner wall to absorb some of the exhaust noise.

Even further, the aft-translating sleeve must be capable of moving a relatively large distance between stowed and deployed positions in order to provide optimum noise-reduction/engine thrust capability at takeoff in the deployed position and optimal engine efficiency at cruise in the stowed position. For wing-mounted engines, the presence of trailing edge control surfaces such as wing flaps may present clearance problems between the translating sleeve and the control surface considering the amount of travel of the translating sleeve.

Another approach to increasing the fan nozzle exit area as a means to reduce noise generated during high thrust events such as during takeoff is through the use of expanding flaps or petals which form the nozzle exit external surface. More typically applied to primary exhaust nozzles of military aircraft, the flaps or petals may be pivoted outwardly to enlarge the throat area of the nozzle and thereby reduce the exhaust velocity. The flaps or petals may also be biased to one side or the other in order to provide thrust vectoring for increased maneuverability of the aircraft. As may be appreciated, the implementation of a flap or petal scheme for changing nozzle exit area is structurally and functionally complex and presents weight, maintenance and cost issues.

An additional consideration in a variable area fan nozzle for reducing exhaust noise is that a movable fan nozzle must be compatible with thrust reversers commonly employed on modern jet engines. As is known in the art, thrust reversers on jet engines may reduce landing distance of an aircraft in normal (e.g., dry) runway conditions or increase safety in slowing the aircraft in slick (e.g., wet) runway conditions. Thrust reversers operate by reorienting the normally aftwardly directed flow of exhaust gasses into a forward direction in order to provide braking thrust to the aircraft. The reorienting of the engine exhaust gasses is facilitated by spoiling, deflecting and/or turning the flow stream of the primary exhaust and/or the fan exhaust.

For turbofan engines, thrust reversers may include the use of cascades, pivoting doors or by reversing the pitch of the fan blades. In cascade-type thrust reverser, the turbofan engine may include an outer translating sleeve which is configured to move axially aft to uncover deflecting vanes mounted in the nacelle cowl. Simultaneous with the aft movement of the translating sleeve, blocker doors in the fan duct are closed in order to redirect the fan flow outwardly through the deflecting vanes and into a forward direction to provide thrust-reversing force. Due to the widespread implementation of thrust reversal capability on many aircraft, a variable area fan nozzle must be compatible with thrust reverser systems commonly employed on modern jet engines As can be seen, there exists a need in the art for a variable area fan nozzle which is effective in increasing the nozzle exit area of a gas turbine engine in order to reduce noise at takeoff by reducing exhaust velocity. In addition, there exists a need in the art for a variable area fan nozzle which can achieve an increase in nozzle area but which requires a minimal amount of travel to avoid interfering with various components such as trailing edge control surfaces. Also, there exists a need in the art for a variable area fan nozzle which is compatible with thrust reversers commonly employed on gas turbine engines. Finally, there exists a need in the art for a variable area fan nozzle which is simple in construction and requiring minimal maintenance.

BRIEF SUMMARY

The above-noted needs associated with fan nozzles of the prior art are specifically addressed and alleviated by the present disclosure which provides a variable area nozzle system for a gas turbine engine wherein a fan nozzle of the nozzle system is specifically configured to move outwardly with simultaneous aft movement of the fan nozzle in order to vary the fan duct throat area of the gas turbine engine. In this regard, the fan nozzle is configured to move between stowed and deployed positions.

The fan nozzle is configured to move outwardly relative to a longitudinal axis of a gas turbine engine while the fan nozzle is simultaneously translated axially in an aft direction from the stowed position to the deployed position in order to vary the fan duct throat area. Likewise, the fan nozzle is configured to move inwardly during axially forward translation back to the stowed position. The fan nozzle, in a preferable embodiment, maintains the same orientation when moved between the stowed and deployed positions. In this regard, the fan nozzle maintains an angled orientation relative to the longitudinal axis during the aft-outward movement and forward-inward movement.

The technical effects of the disclosure include a reduction in the amount of movement required in order to achieve a given increase in fan nozzle throat area as compared to prior art fan nozzles which are purely axially translating (i.e., purely forward and aft motion of the fan nozzle). Furthermore, the fan nozzle as disclosed herein provides a relatively simple structural arrangement with relatively few moving parts as compared to more complex variable fan nozzle arrangements which comprise moveable petals for varying the fan nozzle exit area.

Advantageously, the fan nozzle is adapted to be extended aftwardly from a translating sleeve (i.e., a cowl assembly) of a thrust reverser for a gas turbine engine. In this regard, the fan nozzle is adapted to be operated independently of the thrust reverser and may be moved from the stowed to deployed positions with the thrust reverser either in the open or closed position.

The nozzle system comprises a fan duct inner wall and a fan duct outer wall disposed in radially-spaced relation to the fan duct inner wall. The nozzle system is adapted such that the fan duct outer wall is substantially continuous in order to provide smooth aerodynamic flow across the fan nozzle and the translating sleeve when the fan nozzle is moved between the stowed and deployed positions. Sealing mechanisms provided between the fan nozzle at the nozzle forward edge and the cowl assembly (i.e., translating sleeve) on an aft end thereof minimize any leakage which may otherwise reduce engine efficiency.

In one embodiment, the nozzle system may comprise a first seal which may be configured as a bulb seal disposable in sealing contact between the nozzle forward edge and a cowl outer panel of the translating sleeve such that sealing engagement between the fan nozzle and the translating sleeve is provided when the fan nozzle is moved to the deployed position.

Likewise, a second seal configured in an optional bulb seal embodiment may be provided between the fan nozzle and the aft edge of the cowl inner panel in order to provide sealing engagement between the fan nozzle and the cowl assembly (i.e., translating sleeve) when the fan nozzle is moved to the stowed position. In this manner, the nozzle system provides for sealing of the fan nozzle to the cowl assembly or translating sleeve in the stowed and/or deployed positions in order to maintain aerodynamic efficiency and internal fan duct pressure.

Advantageously, the variable area fan nozzle as disclosed herein allows for at least two different fan duct throat areas. More specifically, when the fan nozzle is in the stowed position, the fan duct throat area is preferably optimized for cruise flight where noise reduction is not an issue. When the fan nozzle is moved to the deployed position, the fan duct throat area is increased in order to reduce the velocity of the fan flow exhaust out of the fan nozzle to thereby reduce the level of noise.

In this regard, the larger fan duct throat area may be selected for higher power settings such as for takeoff where noise suppression is required. A smaller fan duct throat area may be selected for lower power settings such as during cruise flight where noise is not an issue but optimal engine performance dictates a smaller nozzle throat area.

The features, functions and advantages that have been discussed can be achieved independently in various embodiments of the present invention or may be combined in yet other embodiments, further details of which can be seen with reference to the following description and drawings below.

BRIEF DESCRIPTION OF THE DRAWINGS

These and other features of the present invention will become more apparent upon reference to the drawings wherein like numbers refer to like parts throughout and wherein:

FIG. 4 is a sectional illustration taken along lines 4-4 of FIG. 2 and illustrating the fan nozzle extending aftwardly from a fan duct and wherein the fan nozzle is illustrated in the stowed position;

FIG. 4A is an enlarged sectional illustration of a first seal configured to provide sealing of the fan nozzle in the deployed position;

DETAILED DESCRIPTION

Figure 1:
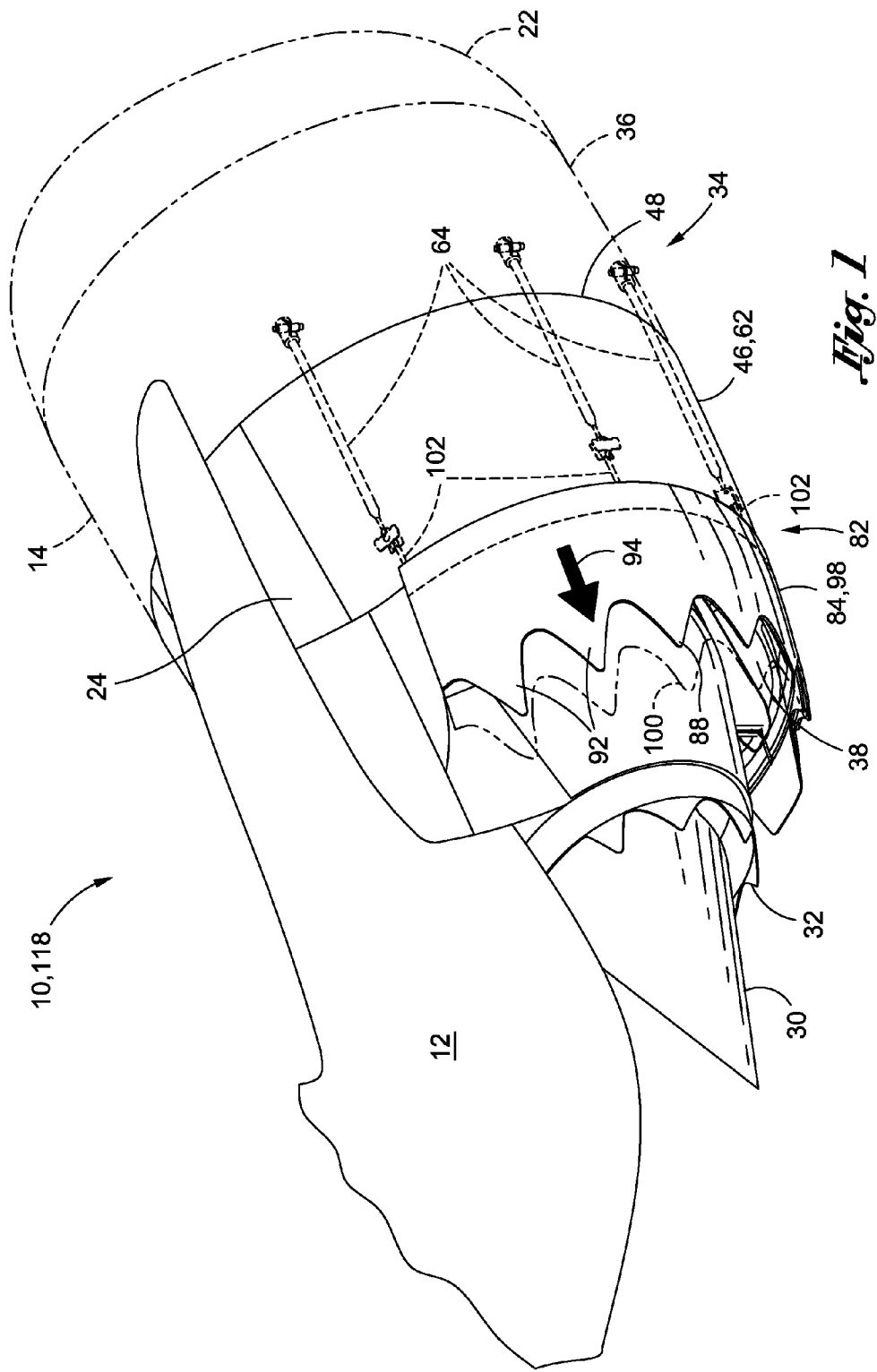
FIG. 1 is an aft perspective illustration of a turbofan gas turbine engine mounted on a strut or pylon of an aircraft.

Referring now to the drawings wherein the showings are for purposes of illustrating preferred and various embodiments of the disclosure only and not for purposes of limiting the same, shown in FIG. 1 is a high bypass turbofan gas turbine engine 10 incorporating a variable area nozzle system 82. In a broad sense, the nozzle system 82 includes a fan nozzle 84 which is specifically configured to move radially outwardly simultaneous with axial movement thereof. More specifically, the fan nozzle 84 is configured to move radially outwardly during axially aft translation and radially inwardly during axially forward translation between stowed and deployed positions 98, 100.

The fan nozzle 84 defines at least a portion of a fan duct outer wall 42 of the turbofan gas turbine engine 10. The fan nozzle 84 includes a nozzle aft edge 88 which, together with a fan duct inner wall 40, defines a fan duct throat area Ta that is increased by the radially outward/axially aft translating motion of the fan nozzle 84. By increasing the fan duct throat area Ta, the velocity of fan flow 44 passing through the fan duct 38 decreases and therefore reduces the level of exhaust noise generated thereby.

Although the present disclosure is described in the context of a high bypass gas turbine engine 10 as illustrated in the Figures, the nozzle system 82 may be implemented on other types of gas turbine engines wherein it is desirable to increase the fan duct throat area Ta to an optimal size for a given engine operating condition. For example, the nozzle system 82 may be configured to allow for movement of the fan nozzle 84 to a deployed position 100 wherein the throat area Ta of the fan nozzle 84 is at a maximum as may be desirable for high thrust settings of the engine 10 such as during takeoff and climb-out but where noise suppression is also desired in order to reduce environmental noise impact. Likewise, the fan nozzle 84 may be moved to the stowed position 98 wherein the throat area Ta of the fan nozzle 84 is minimized or placed in an optimal position for lower engine thrust settings as may be desirable for cruise flight where noise suppression is not required but where nozzle efficiency dictates a reduced throat area of the fan nozzle 84.

Referring to FIG. 1, shown is the gas turbine engine 10 supported by a pylon or strut 12 which, in turn, may be mounted to an aircraft 118. As is known in the art, the turbofan gas turbine engine 10 may include a core engine 28 within which pressurized air may be mixed with fuel for generating combustion gases which flow through turbine stages and are expelled at a primary exhaust nozzle 32. As can be seen in FIG. 1, the primary exhaust nozzle 32 may be defined by a generally conically shaped primary exhaust plug 30 at an aft end of the fan duct inner wall 40.

The fan duct 38 is bounded by the fan duct inner wall 40 and the fan duct outer wall 42. A fan flow 44 passes through the fan duct 38 through the influence of air that is pressurized by a fan (not shown) located at a forward end of the engine 10 near an inlet 22 of the engine 10. A large portion of the propulsive thrust generated by the engine 10 is a result of the pressurized air passing through the fan duct 38 and exiting the fan nozzle 84 which is illustrated with chevrons 92 on the nozzle aft edge 88.

The gas turbine engine 10 includes a nacelle 14 having the inlet 22 at the forwardmost end of the engine 10 and a stationary fan cowl 36 which houses the rotating fan blades (not shown). The stationary fan cowl 36 forms part of a cowl assembly 34 which preferably defines at least a portion of the fan duct outer wall 42. The cowl assembly 34 may further include a translating sleeve 46 for gas turbine engines having thrust reverser capability. The thrust reverser 62 comprising the translating sleeve 46 is configured to move axially aftwardly in order to redirect the fan flow 44 through one or more cascade segments 74 comprising a plurality of deflecting vanes mounted in a circumferential manner about the fan duct 38. Activation of the thrust reverser 62 causes the fan flow 44 to be reoriented into a forward direction when the cascade segments 74 are uncovered by the axially translating sleeve 46. The thrust reverser 62 including the translating sleeve 46 may be actuated by one or more thrust reverser actuators 64 shown in FIGS. 1 and 8 on upper, center and lower sections of left and right engine halves.

Although the engine 10 may be configured such that the inner fan duct 38 comprises an unobstructed annular geometry, the engine 10 may be provided in a bifurcated arrangement wherein the fan duct 38 is divided into two generally semi-cylindrical annular cavities joined at an upper bifurcation 18 along a hinge beam 24 and at a lower bifurcation 20 along a latch beam 26. In this manner, the fan cowl 36 and the fan duct 38 including the cowl assembly 34 and the translating sleeve 46 may be unlatched at the latch beam 26 on the lower end of the nacelle 14 and may be pivoted or hinged upwardly in order to expose the core engine 28 for maintenance purposes. Each of the latch beam 26 and hinge beams 24 may include a cowl slider track 52 and cowl slider beam 54 to which the translating sleeve 46 portion of the cowl assembly 34 including the fan nozzle 84 may be moved axially aft in order to uncover the cascade segments 74 during thrust reverser actuation.

Figure 6:
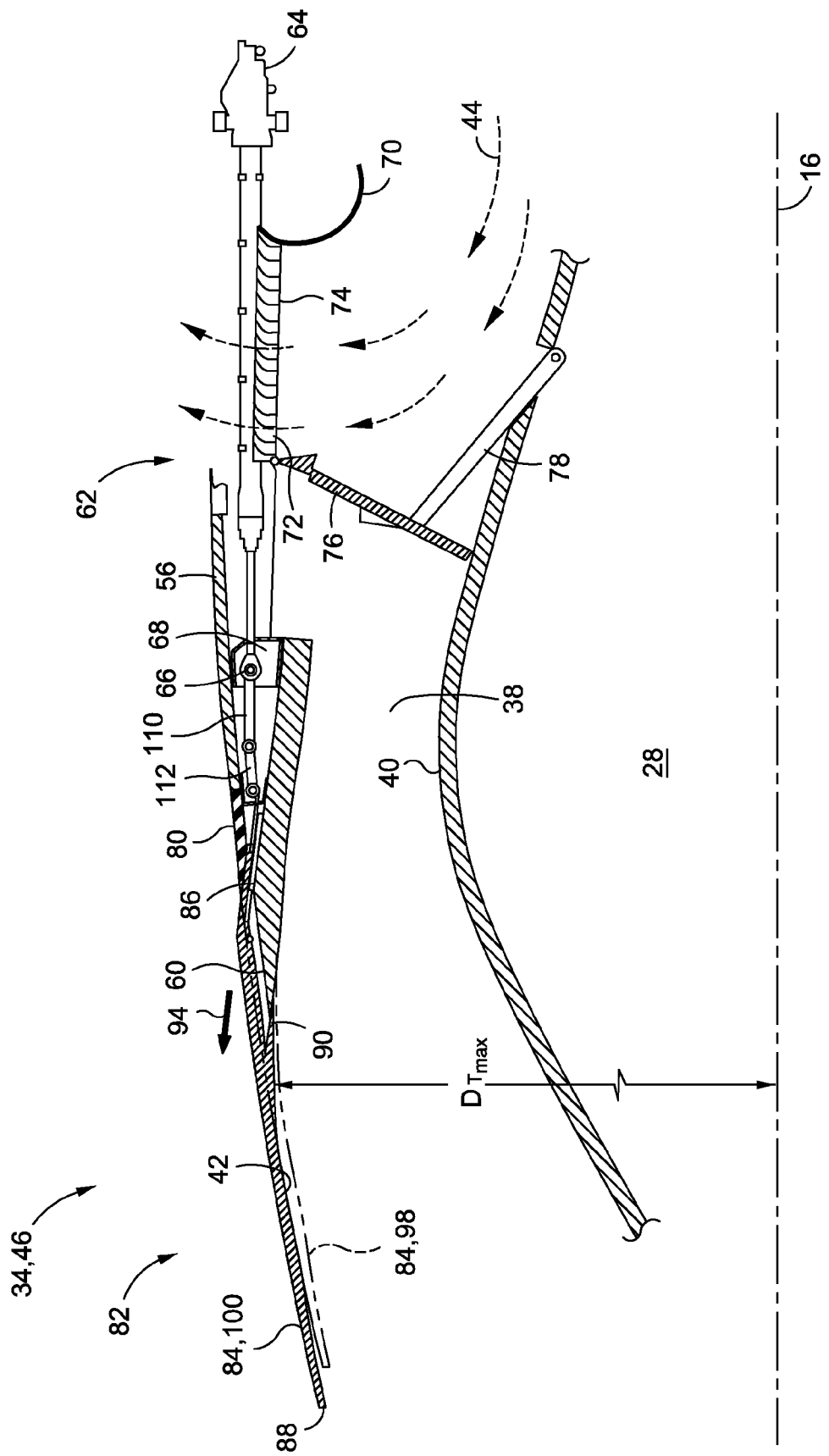
FIG. 6 is a sectional illustration of the fan nozzle illustrating a thrust reverser in an open position.

Referring briefly to FIG. 6, shown is the thrust reverser 62 in an open position wherein it can be seen that the cascade segments 74 are uncovered due to aft axial translation of the translating sleeve 46. The cross-sectional illustration of FIG. 6 illustrates one of the thrust reverser actuators 64 fixedly mounted adjacent a bull nose 70/torque box of the fan cowl 36 and coupled at an opposite end via a rod end 66 coupled to an actuator bracket 68. The actuator bracket 68 may be fixedly mounted between a cowl outer panel 56 and a cowl inner panel 58. The cowl outer panel 56 and cowl inner panel 58 collectively define the translating sleeve 46.

Upon activation of the thrust reverser 62 such that the translating sleeve 46 is moved axially aftwardly, one or more blocker doors 76 are pivoted downwardly into contact with the fan duct inner wall 40 due to drag links 78 pivotably connected to the fan duct inner wall 40 at one end and to the blocker door 76 at an opposite end of the drag link 78. In the deployed position 100, the blocker doors 76 prevent passage of fan flow 44 to the aft end of the fan duct 38 and instead cause the fan flow 44 to be redirected outwardly through the cascade segments 74 in a forward motion for thrust reversal purposes.

The cascade segments 74 are supported by a cascade support ring 72 at an aft end of the cascade segments 74 and by the bull nose 70 and torque box at a forward end of the cascade segments 74. The semi-cylindrical translating sleeve 46 and fan nozzle 84 may be supported at upper and lower sides (i.e., along the upper and lower bifurcations) by a cowl slider beam 54 that slides along a cowl slider track 52 disposed at the hinge beam 24 and latch beam 26 on each half of the engine 10.

Referring to FIGS. 2-5, shown are side views and sectional views of the gas turbine engine 10 illustrating the fan nozzle 84 configured to move simultaneously radially outwardly and axially aftwardly relative to a longitudinal axis 16 of the engine 10. As was earlier indicated, the fan nozzle 84 is specifically adapted to move in an angled relation to the longitudinal axis 16 in an aft-outward and forward-inward direction. In this manner, the fan nozzle 84 is adapted to vary the fan duct throat area Ta. Preferably, the fan nozzle 84 is configured to move between stowed and deployed positions 98, 100 while maintaining the same orientation of the fan nozzle 84 relative to the longitudinal axis 16 during the aft-outward movement and during the forward-inward movement.

Figure 2:
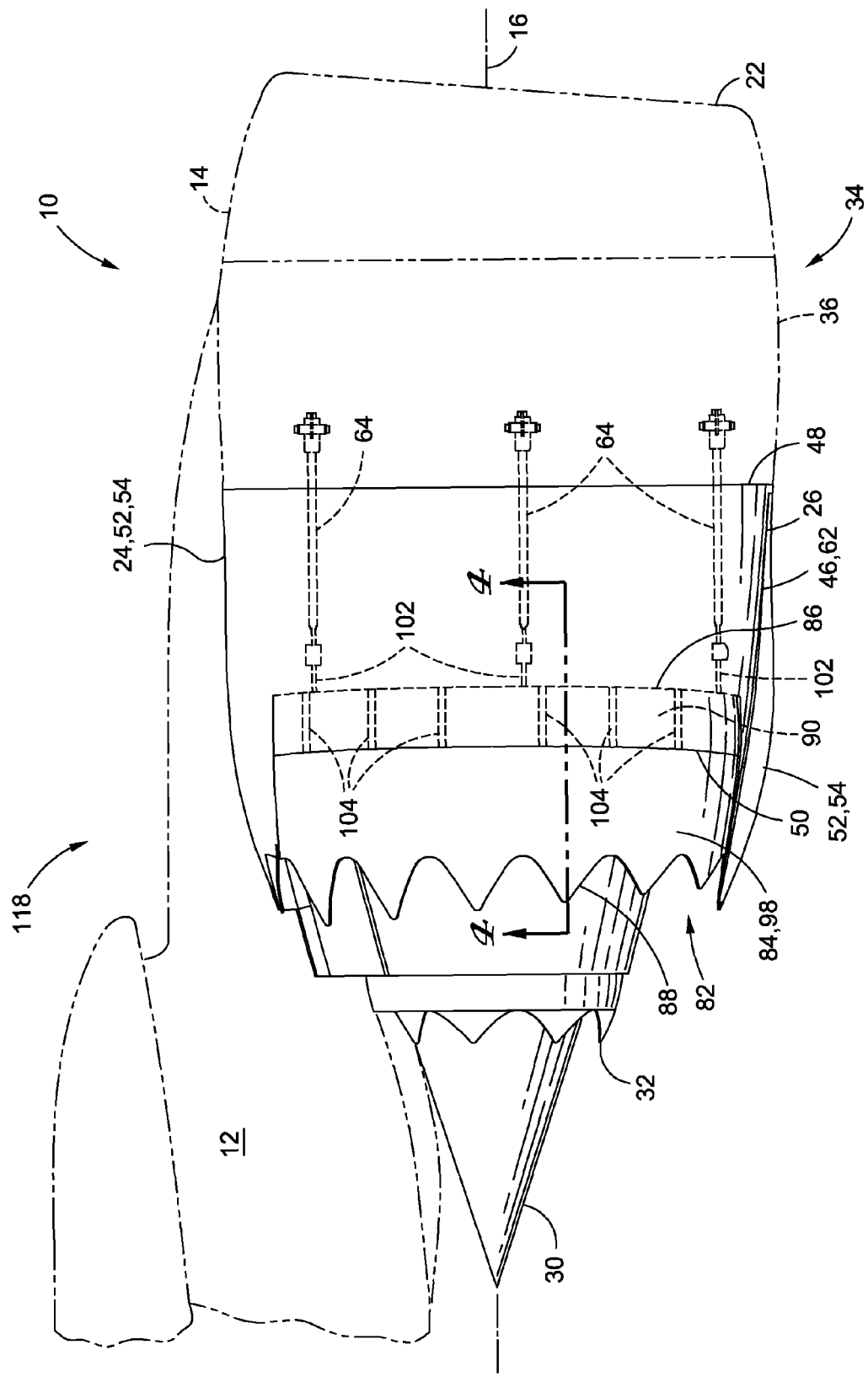
FIG. 2 is a side view of the gas turbine engine illustrating a fan nozzle and a primary exhaust nozzle disposed aftwardly of the fan nozzle.

FIG. 2 illustrates the fan nozzle 84 in the stowed position 98. The fan nozzle 84 extends aftwardly from the translating sleeve 46. The translating sleeve 46 includes a sleeve forward edge 48 which is disposed adjacent to the stationary fan cowl 36. The translating sleeve 46 also includes a sleeve aft edge 50 which is disposed in slightly overlapping relationship with a nozzle forward edge 86. Referring briefly to FIG. 4, shown is a cross-sectional illustration of the fan nozzle 84 and its interconnectivity with the translating sleeve 46. As can be seen, the nozzle forward edge 86 is extendable (e.g., slidable) through an annular slot or opening that may be formed in the translating sleeve 46.

Figure 8:
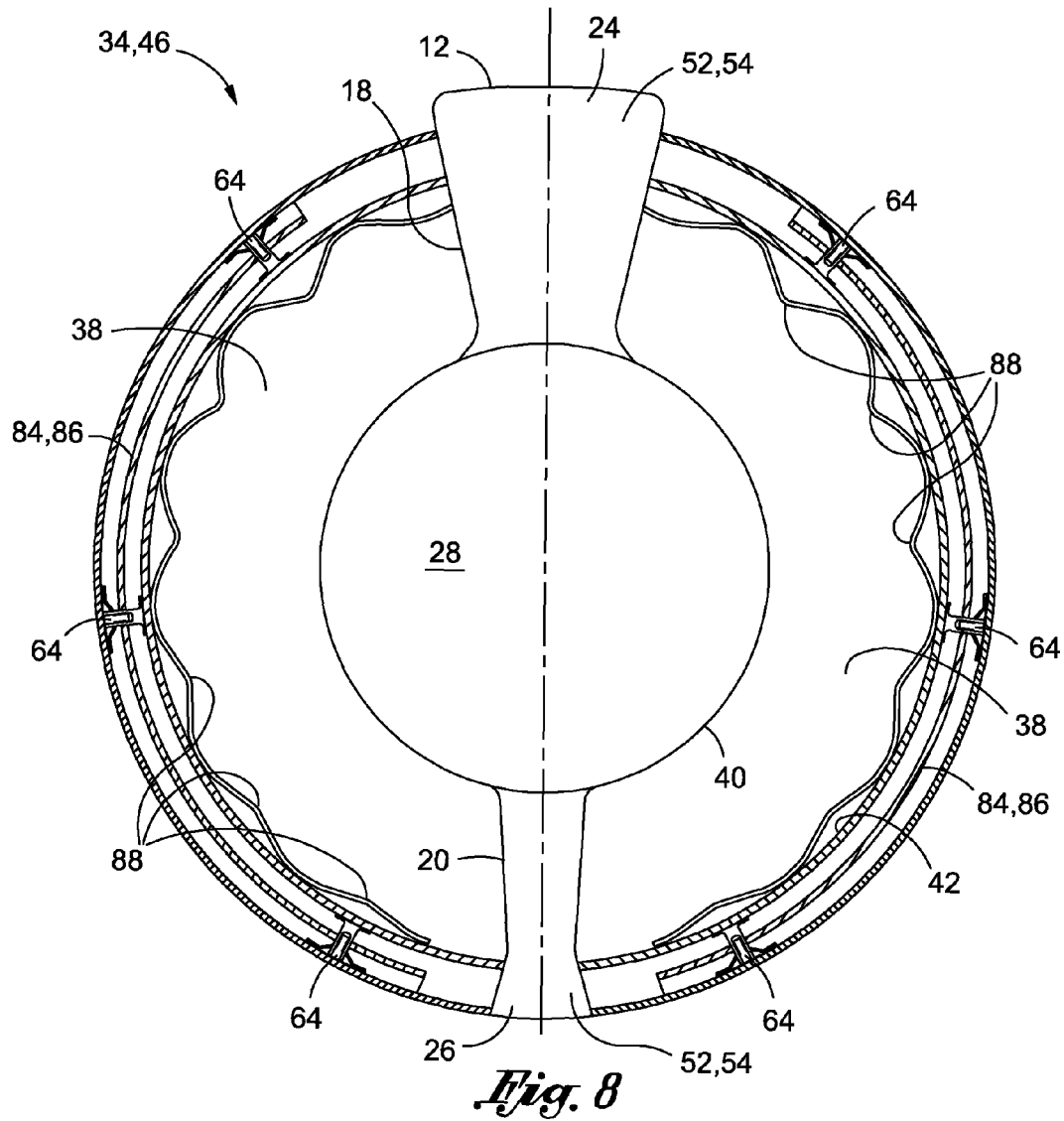
FIG. 8 is a sectional illustration taken along lines 8-8 of FIG. 3 and illustrating a fan nozzle forward edge extending between a cowl inner panel and a cowl outer panel.

In one embodiment illustrated in FIGS. 4 and 8, the translating sleeve 46 may comprise the cowl outer panel 56 and the cowl inner panel 58. FIG. 8 illustrates the fan nozzle forward edge 86 extending between the cowl outer panel 56 and cowl inner panel 58. The nozzle forward edge 86 may be formed as a flange which may be angled slightly inwardly from the exterior nacelle 14 contour defined by the fan nozzle 84 and the cowl outer panel 56. On an interior side of the fan nozzle 84 is a fan nozzle lip 90 which may be disposed in slightly overlapping relationship to an inner panel aft edge 60. The fan nozzle lip 90 may be configured to form a continuation of the fan duct outer wall 42 in order to provide continuity of fan flow 44 through the fan duct 38. When the fan nozzle 84 is in the stowed position 98 as illustrated in FIG. 4, the inside geometry of the fan nozzle 84 adjacent the nozzle forward edge 86 is compatible with the geometry of the cowl outer panel 56 and cowl inner panel 58.

Referring to FIGS. 4 and 4A, shown is a first seal 114 disposed along an outside surface of the nozzle forward edge 86. The first seal 114 may be configured to provide sealing contact with the inside surface of the cowl outer panel 56 when the fan nozzle 84 is moved to the deployed position 100 shown in FIG. 5. The first seal 114 is specifically adapted to prevent loss of pressure within the fan duct 38 as well as to provide aerodynamic sealing of flow passing along the external nacelle 14 surface. An access cover 80 may be included in the area of the first seal 114 for inspection and maintenance of the first seal 114. In one embodiment, the first seal 114 may be configured as a bulb seal which may be mounted on the nozzle forward edge 86 or on the cowl outer panel 56 in such a manner as to prevent rolling of the bulb seal which may otherwise increase wear of the first seal 114.

In this regard, the cowl outer panel 56 and/or the nozzle forward edge 86 may include appropriate geometry to provide proper sealing of the bulb seal to avoid leakage. The seal is preferably configured to provide sealing capability during extreme temperature differentials (i.e., 160° F.) as well as provide adequate compatibility with the flexing nacelle 14 structure in response to dynamic and static loads. Furthermore, the bulb seal is preferably configured to adapt to the complex curved geometry of the engine nacelle 14 and more specifically, to the interface between the nozzle forward edge 86 and the cowl outer panel 56.

Figure 5:
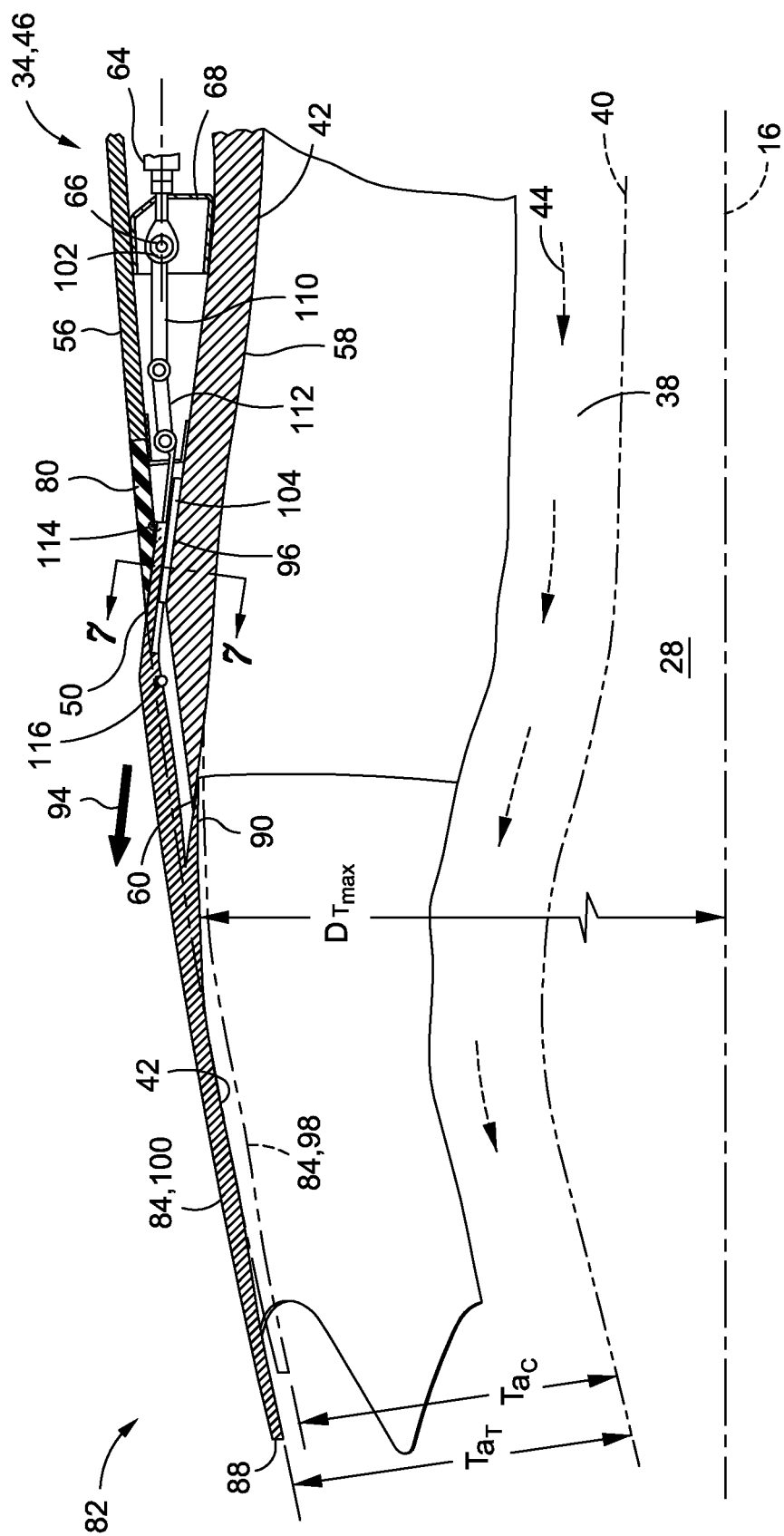
FIG. 5 is a sectional illustration taken along lines 5-5 of FIG. 3 and illustrating the fan nozzle moved outwardly and aftwardly relative to a longitudinal axis of the engine wherein the fan nozzle is moved to the deployed position.

Referring briefly to FIG. 5, shown is the fan nozzle 84 in the deployed position 100. As can be seen, a second seal 116 may be provided between the aft edge of the cowl inner panel 58 and the fan nozzle 84 in order to provide sealing between the components when the fan nozzle 84 is in the stowed position 98 illustrated in FIGS. 4 and 4A. The second seal 116 is also preferably configured to maintain sealing engagement between the fan nozzle 84 and the translating sleeve 46 when the fan nozzle 84 is in the stowed position 98 in order to avoid loss of engine efficiency (i.e., reduced thrust).

The second seal 116 is also preferably configured and mounted in a manner that prevents rolling motion of the second seal 116 as the second seal 116 engages with the cowl inner panel 58 and/or with the inside surface of the fan nozzle 84. Although the first and second seals 114, 116 are described as bulb seals, any seal geometry or configuration may be provided and is not solely limited to that which is illustrated in FIGS. 4, 4A and 5. Furthermore, the first and second seals 114, 116 may be mounted at any location and are not limited to the positions shown in the figures.

Figure 3:
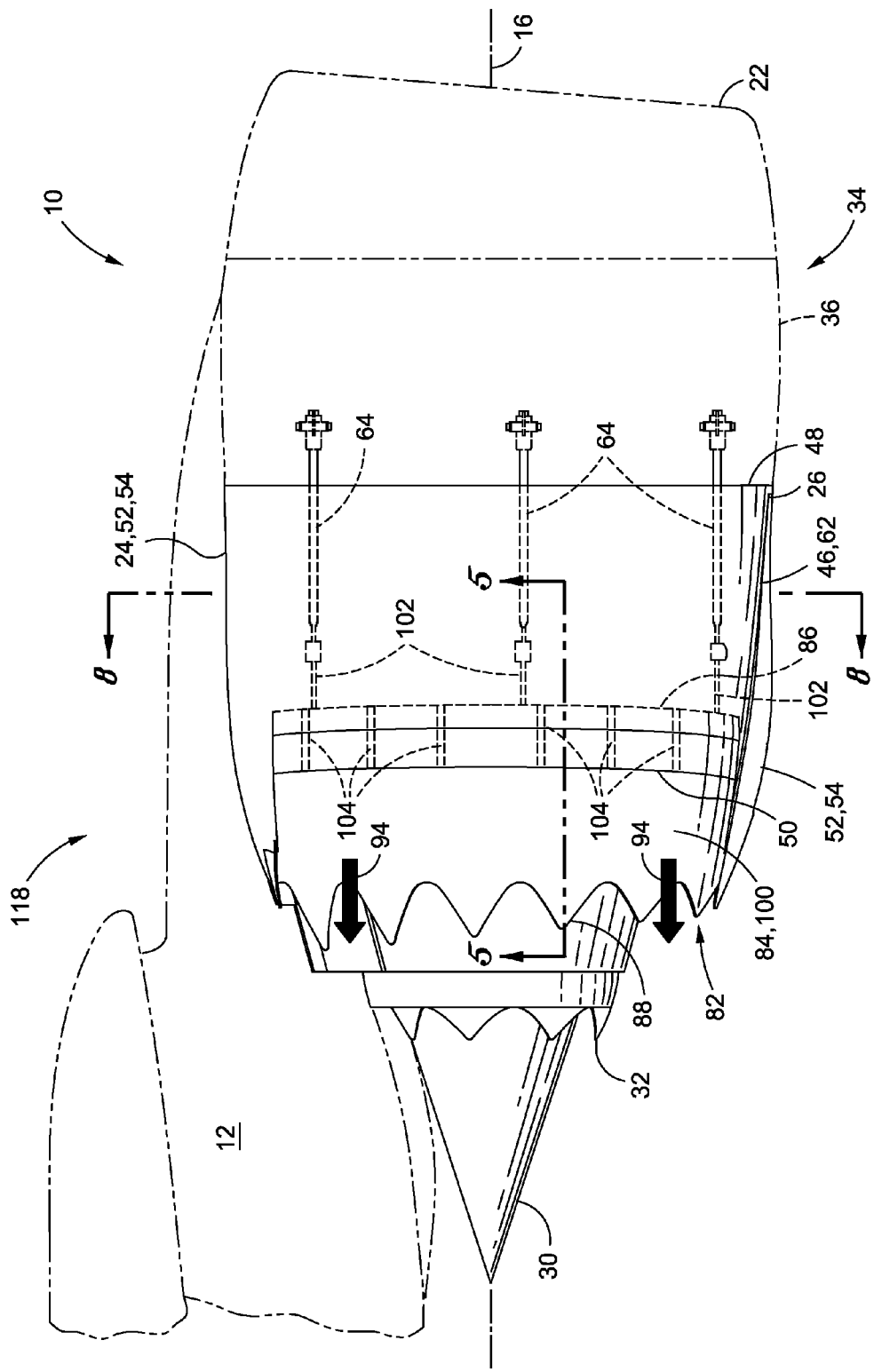
FIG. 3 is a side view of the gas turbine engine illustrating the fan nozzle moved outwardly and aftwardly into its deployed position as compared to the stowed position of the fan nozzle illustrated in FIG. 2.

Referring briefly to FIG. 3, shown is a side view of the engine nacelle 14 illustrating the fan nozzle 84 in the deployed position 100 where it can be seen that the sleeve aft edge 50 and the nozzle forward edge 86 are disposed in relatively closely-spaced relationship to one another as compared to the increased spacing illustrated in FIG. 2. Also illustrated in FIG. 3 is a plurality of fan nozzle slider mechanisms 104 which may facilitate movement of the fan nozzle 84 relative to the translating sleeve 46.

Figure 7:
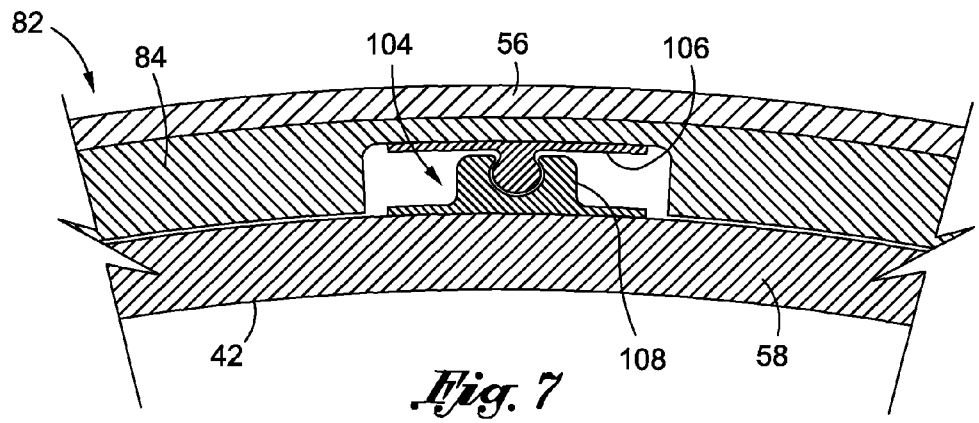
FIG. 7 is a sectional illustration taken along lines 7-7 of FIG. 5 and illustrating a slider mechanism in one embodiment comprising a tongue element and a groove element slidable in relation to one another.

Referring to FIGS. 4, 4A, 5 and 7, shown is a slider mechanism 104 for slidably connecting the fan nozzle 84 to the cowl inner panel 58. As best seen in FIG. 7, the slider mechanism 104 may be configured as a tongue element 106 (i.e., guide element) which is slidably connected to a groove element 108 (i.e., slot element). The groove element 108 may be configured as a bracket mounted to the cowl inner panel 58 while the tongue element 106 may be configured as a bracket mounted to the fan nozzle 84 at the nozzle forward edge 86. As can be seen in FIG. 7, the nozzle forward edge 86 may include a localized relief for accommodating the nozzle slider mechanism 104. The cowl outer panel 56 may be disposed in abutting slidable contact with the exterior surface of the fan nozzle 84 to provide aerodynamic continuity along the exterior surface of the nacelle 14.

Referring to FIGS. 2 and 3, the slider mechanisms 104 are illustrated as being installed in one embodiment in angularly-spaced relation to one another. The slider mechanisms 104 are preferably sized and configured to react the relatively large internal pressure forces acting against the fan cowl 36 and which are directed generally radially outwardly. In this regard, the slider mechanisms 104 are preferably adapted to accommodate 3 or 4 Pascals of pressure acting against the fan nozzle.

In addition, the slider mechanisms 104 are preferably configured to avoid coupling of pressure frequencies in the fan duct 38 with a resonant frequency of the fan nozzle 84 which would otherwise increase the loads imposed on the slider mechanisms 104. It should be noted that although the slider mechanisms 104 are illustrated as being disposed in angularly-spaced relation along each fan nozzle 84 forward edge, the slider mechanisms 104 may be disposed at any location capable of resisting the loads imposed on the fan nozzle.

Furthermore, although the slider mechanisms 104 are illustrated as comprising a tongue 106 and groove element 108, alterative embodiments of the slider mechanisms 104 are contemplated.

Referring to FIGS. 4-5, it can be seen that when the fan nozzle 84 is moved between the stowed and deployed positions 98, 100, the fan duct outer wall 42 is substantially continuous across the fan nozzle 84 and the translating sleeve 46 (i.e., cowl assembly 34) in order to provide uninterrupted flow through the fan duct 38. It can also be seen that the fan nozzle 84 preferably moves along a direction of travel 94 which may be parallel to a tangency line 96 (i.e., parallel to the cowl inner panel 58). In one embodiment, the junction of the fan nozzle 84 with the cowl inner panel 58 is preferably positioned at an area of maximum diameter $D_{Tmax}$ of the fan duct inner wall 40 as shown in FIG. 5. As shown, the aft end of the cowl inner panel 58 may be angled outwardly relative to the longitudinal axis 16 (i.e., engine centerline) of the engine 10. However, the junction between the fan nozzle 84 and the cowl inner panel 58 may be positioned at any location along the fan duct inner wall 40.

Referring briefly to FIG. 5, shown are the relative positions of the fan nozzle 84 in the stowed and deployed positions 98, 100. The fan nozzle 84 in the stowed position 98 results in a fan nozzle 84 throat area designated by $Ta_C$ which may be a desired position of the fan nozzle 84 where noise is not an issue such as during cruise flight of the aircraft 118. The fan nozzle 84 in the deployed position 100 results in an increased fan nozzle 84 throat area designated by $Ta_T$ which may be a desired position of the fan nozzle 84 where noise reduction is desired such as during takeoff and climb-out of the aircraft 118.

As was earlier indicated, the configuration of the fan nozzle 84 results in a relatively large increase in nozzle throat area Ta due to the aft-outward movement of the fan nozzle 84 as compared to prior art fan nozzle configurations which are purely axially translating. For example, in one embodiment, the fan nozzle 84 as disclosed herein may provide two (2) to three (3) times the increase in fan nozzle throat area Ta than the amount of increase provided by prior art fan nozzle configurations which are purely axially translating. Furthermore, depending upon the curvature of the fan duct inner wall 40, a purely aft translating fan nozzle may be unable to achieve the amount of increase in fan nozzle throat area Ta that may be provided by the fan nozzle 84 of the present disclosure.

As illustrated in FIG. 6, the fan nozzle 84 extends aftwardly from the translating sleeve 46 and is movable between the stowed and deployed positions 98, 100 when the translating sleeve 46 is moved axially aft for thrust reversal purposes. In one embodiment, it is contemplated that the thrust reverser actuator 64 may be co-located with the fan nozzle actuator 102. For example, the thrust reverser actuator 64 may include a telescoping connecting member 110 which is extendable outwardly from a rod end 66 of the thrust reverser actuator 64 as illustrated in FIGS. 4-6.

The connecting member 110 may be connected to the fan nozzle 84 forward edge by means of a link 112 having pivoting capability to accommodate movement of the nozzle forward edge 86 between stowed and deployed positions 98, 100 of the nozzle forward edge 86. However, it should be recognized that the fan nozzle actuator 102 illustrated in FIGS. 4, 5 and 6 is exemplary in nature and should not to be construed as limiting other alternative embodiments of the fan nozzle actuator 102 for facilitating the aft-outward and forward-inward motion of the fan nozzle 84. Regardless of the specific actuation mechanism for the fan nozzle 84 and thrust reverser 62, it is contemplated that the thrust reverser actuator 64 and fan nozzle actuator 102 are separate systems in order to avoid uncommanded activation of the thrust reverser 62.

In one embodiment, the nozzle system 82 may include three fan nozzle actuators 102 for the fan nozzle 84 on each side (i.e., left and right sides) of the engine 10 in order to avoid skewed deployment or retraction which may result in binding of the fan nozzle 84. It should also be noted that although the fan nozzle 84 is shown as being in the stowed or deployed positions 98, 100 in FIGS. 4 and 5, the fan nozzle 84 may be configured to be selectively movable to a predetermined position corresponding to an operating parameter of a gas turbine engine 10. For example, the fan nozzle 84 may be moved to any one of a plurality of intermediate positions between the stowed and deployed positions 98, 100 and is not limited to either one or the other extreme. Advantageously, the configuration of the fan nozzle 84 avoids any reduction in acoustic treatment which may be applied along the fan duct inner wall 40.

The present disclosure also provides a methodology for varying the fan duct throat area Ta of a gas turbine engine 10. As was indicated above, the gas turbine engine 10 may include the fan duct inner wall 40 and the fan duct outer wall 42 disposed in radially-spaced relation to the fan duct inner wall 40. The fan nozzle 84 may define at least a portion of the fan duct outer wall 42. The method may comprise the step of moving the fan nozzle 84 outwardly relative to the longitudinal axis 16 during axially aft translation of the fan nozzle 84. In this regard, the method may comprise moving the fan nozzle 84 in the aft-outward motion and/or in the inward-forward motion.

The method may further comprise the step of maintaining the orientation of the fan nozzle 84 relative to the longitudinal axis 16 when moving the fan nozzle 84 between stowed and deployed positions 98, 100. In this regard, the fan nozzle 84 is preferably maintained in the same angled relationship with the longitudinal axis 16 (i.e., engine centerline) when moved between the stowed and the deployed positions 98, 100. The method may further comprise the step of maintaining the continuity of the fan duct outer wall 42 across the fan nozzle 84 and the cowl assembly 34 (i.e., translating sleeve 46) when moving the fan nozzle 84 between the stowed and deployed positions 98, 100.

The above description is given by way of example and not limitation. Given the above disclosure, one skilled in the art could devise variations that are within the scope and spirit of the embodiments disclosed herein. Furthermore, the various features of the embodiments disclosed herein can be used alone or in any varying combinations with each other and are not intended to be limited to the specific combinations described herein. Thus, the scope of the claims is not to be limited by the illustrated embodiments.

What is claimed is:

1. A method of varying a fan duct throat area of a gas turbine engine having a longitudinal axis and a thrust reverser having movable blocker doors configured to block fan flow through the fan duct when the thrust reverser is activated, comprising the step of:
   non-pivotably moving a fan nozzle radially outwardly along a direction diverging from the longitudinal axis while simultaneously translating the fan nozzle in an axially aft direction without activating the thrust reverser.

2. The method of claim 1 further comprising the step of:
   moving the fan nozzle outwardly during axially aft translation and inwardly during axially forward translation between stowed and deployed positions.

3. The method of claim 2 further comprising the step of:
maintaining an orientation of the fan nozzle relative to the longitudinal axis when moving the fan nozzle between the stowed and deployed positions.

4. The method of claim 2 wherein the gas turbine engine includes a cowl assembly and a fan duct outer wall, the fan nozzle defining at least a portion of the fan duct outer wall, the method further comprising the step of:
substantially maintaining continuity of the fan duct outer wall across the cowl assembly and the fan nozzle when moving the fan nozzle between the stowed and deployed positions.

5. The method of claim 4 wherein the cowl assembly includes a translating sleeve, the method further comprising the steps of:
moving the translating sleeve axially aft for thrust reversal; and
extending the fan nozzle aftwardly from the translating sleeve when moving the translating sleeve axially aft.

6. The method of claim 5 wherein the translating sleeve has a sleeve aft edge defining a tangency line, the method further comprising the step of:
moving the fan nozzle along a direction parallel to the tangency line.

7. The method of claim 1 further comprising the step of:
moving the fan nozzle to a predetermined position corresponding to an operating parameter of the gas turbine engine.

8. The method of claim 1 further comprising the step of:
sliding the fan nozzle along a fan nozzle slider mechanism slidably connecting the fan nozzle to a cowl assembly.

9. A method of varying a fan duct throat area of a gas turbine engine having a longitudinal axis and a thrust reverser, the thrust reverser having movable blocker doors configured to block fan flow through the fan duct when the thrust reverser is activated, comprising the steps of:
non-pivotably moving a fan nozzle radially outwardly along a direction diverging from the longitudinal axis while simultaneously translating the fan nozzle in an axially aft direction to vary the fan duct throat area; and
moving the fan nozzle without activating the thrust reverser.

* * * * *